March 27, 1934.　　H. S. DE MALAUSSENE　　1,952,791
AUTOMATIC GENERATOR REGULATOR
Filed April 6, 1932
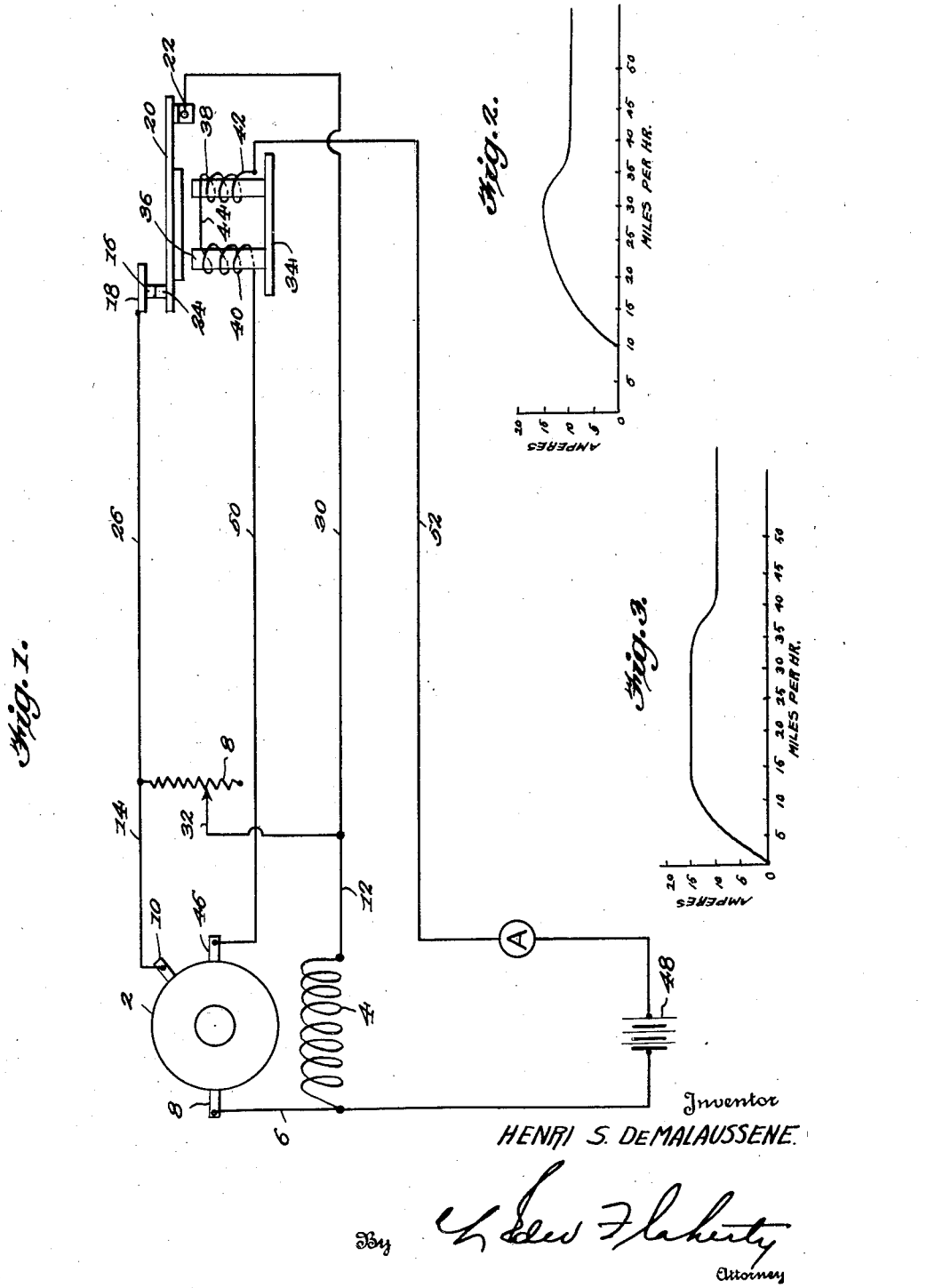
Inventor
HENRI S. DE MALAUSSENE.

Patented Mar. 27, 1934

1,952,791

UNITED STATES PATENT OFFICE 1,952,791

AUTOMATIC GENERATOR REGULATOR

Henri S. de Malaussene, Santa Monica, Calif., assignor to Adolph L. Bernheimer, Santa Monica, Calif.

Application April 6, 1932, Serial No. 603,614

2 Claims. (Cl. 171—313)

The present invention relates to an automatic generator regulator and more specifically to a regulator which is adapted to automatically control the generator output current of a motor vehicle.

In the construction of motor vehicles it is the general practice to drive the generator which supplies the battery with its charging current, from the engine thereof. The generators are usually of the three brush type and the field regulating brush is usually adjusted to a position which will supply at the average rate of speed of the engine a charge to the battery of about 15 amperes. Considerable difficulty, however, has been encountered due to the fact that a constant output current is not maintained and the battery thereof does not receive sufficient charge for the reason that the output of the generator decreases when the motor decreases in speed while idling and when driving through traffic or the like.

This is especially true now that the majority of motor vehicles are equipped with free wheeling and consequently when the motor is idling the output of the generator decreases and the battery does not receive sufficient charging current.

It is one of the objects of the present invention to provide an automatic regulating device which will maintain the output current of the generator substantially constant at low and high speeds and consequently increase the life of the battery.

Another important object of the invention is to provide a regulating device which may be adjusted to obtain an output current of any value, depending upon the size of the generator and the current consumed by the car and its accessories.

The invention contemplates the provision of a variable resistance which is connected in series with the shunt field of a three brush generator which is usually driven by the engine of the motor vehicle. An electrical make and break contact is connected in shunt with the variable resistance and is controlled by means of a magnet which has its winding connected in series with the battery and the output brushes of the generator, to the end that upon an increase in speed of he motor the generator output is increased and the make and break switch is maintained in its open position by the magnet and upon a decrease in speed the output of the generator consequently decreases, permitting the make and break switch to close and shorten out the resistance to increase the output of the generator, thereby maintaining the same substantially constant.

In the accompanying drawing, forming a part of this application and in which like numerals are employed to designate like parts throughout the same, Figure 1 is an electrical diagram of connection illustrating the manner in which the variable resistance is connected in the shunt field and in which the electrical contact is controlled by means of the magnets which have their windings connected in series with the output circuit, Figure 2 is a curve in which the ampere output is plotted against the miles per hour of the ordinary generator now in use, Figure 3 is a curve in which the ampere output is plotted against the miles per hour of the present invention.

In the drawing wherein for the purpose of illustration is shown a preferred embodiment of the invention, the numeral 2 generally designates the commutator of a generator which is usually installed as standard equipment in a motor vehicle and which is driven by the motor thereof. The generator is provided with a shunt field 4 which is connected through a conductor 6 to one of the output brushes 8 of the generator and has its other terminal connected in series with a variable resistance 8 and the field regulating brush 10 of the generator through the conductors 12 and 14.

A make and break switch which consists of a stationary contact 16 mounted on a support 18 and a resiliently mounted armature 20 mounted on a support 22 and having a contact 24 on one end thereof adapted to associate with the stationary contact 16, is connected in shunt with the variable resistance 8 through a conductor 26 which is connected to one terminal of the resistance and a conductor 30 which is connected to the variable switch arm 32 of the variable resistance.

The opening and closing of the associated electrical contacts 16 and 24 is controlled by means of a pair of magnets which are provided with a support 34 having thereon a pair of spaced cores 36 and 38 of soft iron and windings 40 and 42 which are connected in series by means of the conductor 44. The magnets are disposed directly beneath the armature 20 and the windings 40 and 42 are connected in series with the output brushes 8 and 46 and the battery 48 through conductors 50, 52 and 6.

The associated electrical contacts 16 and 24 are normally held in closed position by means of the resiliently mounted arm 20 and the windings 40 and 42 are of sufficient strength so that upon the generator reaching a predetermined speed and consequently a predetermined output current, the magnetic flux will overcome the tension of the resilient armature 20 opening the associated electrical contacts 16 and 24 permitting the current to flow through the variable resistance 8 which has been adjusted to give substantially the same output current of the generator.

When installing the devise the field regulating brush 10 is set to the full output of the generator which in most motor vehicles is about 20 amperes. The resistance 8 is then adjusted until the ammeter reads about 15 amperes which is a safe charging rate when the contacts 16 and 24 are open and the engine of the motor vehicle is running at high speeds. The windings 40 and 42 which are in series with the battery and the output terminals of the generator are of sufficient strength to move the armature to a position in which the contacts 16 and 24 are out of engagement when the motor vehicle is running at an average or high rate of speed and the battery is receiving its normal charge.

Upon a decrease in speed of the motor or when the same is idling, the charging current will decrease and consequently the magnetic flux created by the series windings 40 and 42 will not be sufficient to hold the armature and maintain the contacts in open position, but will permit them to close and thereby shorten out the resistance 8 thus permitting more current to flow through the field which will, in turn, bring the generator's output up to a maximum output or charging rate at slow speed.

Figure 2 is a curve illustrating the output charging current of the ordinary generator which is not equipped with the present regulating means. As is clearly illustrated in this curve, when the motor vehicle is running at slow speeds and consequently driving the generator at a slow speed, say for example, 10 miles per hour, there is no output current and the generator does not provide a sufficient output charging current to the battery until the motor vehicle has reached a speed of substantially 25 to 30 miles per hour.

In Figure 3 there is shown a curve in which the ampere output current is plotted against the miles per hour of the vehicle which drives the generator. It will be seen from this curve that the normal output charging current of 15 amperes is reached at the usual idling speed of 10 miles per hour and from a speed of 10 to 35 miles per hour, the output of 15 amperes is substantially constant.

The variable resistance 32 enables the output of the generator to be set substantially at any output value. If so desired, the control mechanism controlling the actuation of the electrical switch for shortening out the variable resistance may be included within the generator, the same being built as a single unit.

It will thus be seen that the contacts 16 and 24 will open and close depending upon the output of the generator and that the variable resistance may be so adjusted as to maintain any output desired thereby enabling the motor vehicle to idle and still supply the battery with a charging current. It is obvious that the regulator will not only supply the battery with a charging current at slow speed, but will also prevent the generator from burning out at high speed.

If so desired, the electrical switching mechanism for shunting out the variable resistance may be included within the housing covering the generator or may be secured as a separate unit thereto.

While there is shown only one embodiment of the invention in the accompanying drawing, it is capable of various changes and modifications without departing from the spirit and scope thereof and it is therefore to be understood that only such limitations shall be imposed thereon as are indicated in the prior art or in the appended claims.

Having thus described the invention what is claimed as new is:

1. A regulating device for a third brush motor vehicle generator having a predetermined third brush adjustment, adapted to charge the battery of the motor vehicle comprising a field, a variable resistance, one terminal of the field being connected to one of the brushes of the generator, the other field terminal being connected to one terminal of the resistance, the other terminal of the resistance being connected to the third brush, whereby the third brush may be positioned at its maximum output position and the field current regulated by adjusting the variable resistance, a make-and-break switch connected in shunt with said resistance and a magnet for actuating the make-and-break switch having windings included in series between the output terminals of the generator and the battery.

2. A regulating device for a third brush motor vehicle generator adapted to charge the battery of the motor vehicle, comprising a field, a resistance, one terminal of the field being connected to one of the brushes of the generator, the other field terminal being connected to one terminal of the resistance, the other terminal of the resistance being connected to the third brush, the third brush being positioned at its maximum output position, a make-and-break switch connected in shunt with said resistance, and a magnet for actuating the make-and-break switch having windings included in series between the output terminals of the generator and the battery, said resistance being of a value to give the desired third brush regulation when said resistance is effective.

HENRI S. DE MALAUSSENE.